MAGNETIC MEMORY

Filed April 9, 1956 5 Sheets-Sheet 1

INVENTORS
HAWLEY K. RISING
RICHARD G. COUNIHAN

BY

Ralph L. Thomas

ATTORNEY

INVENTORS
HAWLEY K. RISING
RICHARD G. COUNIHAN
BY
Ralph L. Thomas
ATTORNEY

INVENTORS
HAWLEY K. RISING
RICHARD G. COUNIHAN
BY
Ralph L. Thomas
ATTORNEY

*INVENTORS*
HAWLEY K. RISING
RICHARD G. COUNIHAN
*BY*
Ralph L. Thomas
ATTORNEY

INVENTORS
HAWLEY K. RISING
RICHARD G. COUNIHAN
BY
Ralph L. Thomas
ATTORNEY

United States Patent Office 3,007,141
Patented Oct. 31, 1961

3,007,141

MAGNETIC MEMORY

Hawley K. Rising, Lexington, Mass., and Richard G. Counihan, Poughkeepsie, N.Y., assignors, by direct and mesne assignments, to Research Corporation, New York, N.Y., a corporation of New York Filed Apr. 9, 1956, Ser. No. 576,976
10 Claims. (Cl. 340—174)

This invention relates to memory devices and more particularly to memories of the type which employ magnetic elements.

The incorporation of bistable ferromagnetic elements in memory devices of high speed digital data processing machines may be attributable in good measure to their characteristic stability and relatively short switching time. The need in digital data processing systems for addressable memory devices of this type having large storage capacity led to the development of memory systems employing ferromagnetic elements in a three dimensional arrangement. Many drive lines in each of three coordinates with rather complex selection control circuits resulted. In one form of previously known three dimensional memory devices employing magnetic elements, three current carrying lines are required to write a predetermined binary digit in a magnetic element. For example, X and Y drive lines through a magnetic element are energized simultaneously with positive half write currents to change the magnetic state, where half write currents may be defined as currents of substantially similar amplitude which together create a magnetomotive force greater than the coercive force of a magnetic element, but taken individually each creates a magnetomotive force less than the threshold force. If a magnetic element receives a negative half write current on a third drive line, sometimes designated as a Z or inhibit winding, coincident with the application of current to the X and Y drive lines, the effect is to counterbalance a sufficient portion of the net magnetomotive force of the X and Y drive lines to inhibit a change of magnetic state. To the extent that the total positive current is not counterbalanced, a disturbance in the magnetic state of the magnetic element results which upon read out creates a factor of noise or unwanted signal. Since the X and Y drive lines in all memory planes are interwoven, the half write current passing through partially selected magnetic elements creates additional disturbances to their magnetic states. By further writing operations, the magnetic state of various magnetic elements may be caused to deviate from an optimum magnetic state. That is, an element in one stable state may leave the state of maximum remanent flux by a relatively small amount, and upon read out the magnetic element will accordingly yield less than the optimum signal. The sense winding in one form of a previously known three dimensional system threads all magnetic elements of an individual plane. At read time, the X and Y half read currents passing through all memory planes cause unwanted signals to be generated which may result in a combined signal on the sense winding in opposition with the signal generated by the selected magnetic element. If reliability is to be maintained, the net effect of the magnetic disturbance created by writing operations and unwanted signals created during reading operations must be kept sufficiently small that their combined effect on an output signal does not prevent detection of the binary state of selected magnetic elements. However, as the hysteresis characteristic curve of the magnetic elements approaches a rectangle, the effects of magnetic disturbances created by writing operations and unwanted signals created during reading operations are diminished. Nevertheless, the foregoing factors serve to impose an upper limit on the size of practical memory systems of this type.

In order to effect read out operations in one previously known magnetic memory device, the X and Y drive lines may be coincidently energized with half read currents which are similar in amplitude to the half write currents but of opposite polarity. All magnetic elements of a selected register are accordingly set to a predetermined one of their bistable states, and a change in magnetic state is detected by sampling the voltage on the sense winding in each memory plane. The regulation of half write and half read currents on the many drive lines in a memory system of this type further complicates a rather complex selection control device.

According to the principles of the present invention, a relatively less complex arrangement employing magnetic elements is provided wherein only two drive lines are employed for writing in a given magnetic element and a single drive line for reading from a given magnetic element. A plurality of two dimensional memory planes each having separate and independent sets of co-ordinate drive lines are employed. Since the co-ordinate drive lines of each two dimensional memory array are electrically separate and independent from the co-ordinate drive lines of the remaining two dimensional memory arrays, any noise created by writing in the various arrays is localized and the cumulative effect of noise in the memory system as a whole is minimized. The selection control circuits which drive the co-ordinate lines of the various memory planes are simplified by the use of a matrix switch composed of magnetic elements as the driving means. The magnetic elements of the matrix switch are operated on the saturation portion of the hysteresis loop, thereby providing substantial uniformity in amplitude of the currents supplied to the two-dimensional memory arrays and reducing the need for further current regulating equipment. By employing two-dimensional memory planes which are electrically independent, the cumulative effect of noise or magnetic disturbance no longer restricts the size of the memory system to a given number of two-dimensional memory planes. For read out purposes only, the magnetic elements of a selected register are interrogated, thereby further reducing unwanted signals to a minimum.

The foregoing advantages are secured in the illustrated embodiment by using a plurality of individual memory arrays controlled with a matrix switch. Each memory array may be considered as a two-dimensional storage system having magnetic elements designated by columns and rows, each row of magnetic elements constituting a storage register. Data storage in a memory array may take place by the coincident application of a half write current to a selected row and other half write currents to given columns. A matrix switch composed of magnetic elements designated by rows and columns may be employed to generate half write currents which control the writing operation in the various memory arrays. Each individual memory array is associated with a given column of magnetic elements in the matrix switch. More specifically, there is one magnetic element in each column of the matrix switch coupled to drive with a half write current all magnetic elements of a given row or register address of the associated memory array and one magnetic element in each column of the matrix switch coupled to drive with a half write current all magnetic elements of a given column. In other words, the number of cores in a certain column of the matrix switch is equal to the number of rows plus the number of columns of the associated memory array. Thus, one portion of magnetic elements in each column of the matrix switch may be referred to as address elements and the remaining portion of magnetic elements in each column as data elements.

Selection of a particular memory array can be made by selecting the associated column of magnetic elements in the matrix switch. Column selection in the matrix switch may be performed by applying a zero current to the drive line associated with the selected column and by applying inhibit currents in one direction to the drive lines associated with the unselected columns. An inhibit current may be defined as a current having a minimum amplitude sufficient to create a magnetomotive force which, in opposition with magnetomotive forces that may be established by write currents described below, is sufficient to prevent the threshold force of a given magnetic element from being exceeded. Once column selection in the matrix switch is made, one magnetic element in the address portion and various magnetic elements in the data portion representative of a given binary number are driven to a predetermined magnetic state by write currents applied on drive lines associated with the rows of the matrix switch. All remaining drive lines associated with the rows of the matrix switch receive no current. Write currents applied on the drive lines associated with the rows of the matrix switch, simultaneously with the inhibit currents or subsequent thereto, are sufficient in amplitude to create a magnetomotive force greater than the coercive force of the magnetic elements. The write currents are in a direction to create a magnetomotive force in opposition with the magnetomotive force created by the inhibit current in the drive lines associated with the unselected columns. Hence writing takes place in the selected column which, as pointed out, has no inhibit current, and writing is prevented in the unselected columns by the inhibit currents. The selected vertical drive line with zero current is next deselected by applying thereto a reset or read current which establishes a magnetomotive force greater than the coercive force and in the same direction as the inhibit magnetomotive force; whereupon read out from the magnetic matrix occurs and the magnetic elements which undergo a change in magnetic state establish coincident half write currents to a selected row and various columns of the associated memory array. Thus, data is stored in a chosen address of a selected array where it may be retained until needed, at which time it may be read therefrom by pulsing a single line on which a read current is applied to the magnetic elements of that address only. The amplitude and direction of the read current is such that it produces a magnetomotive force greater than the coercive force and in a direction opposite to the magnetomotive force of the half write currents. A single sense winding provided for each column of an individual memory array is common to all magnetic elements of a given column of that array. Accordingly, only one magnetic element per sense winding undergoes a magnetic change whenever read out from a register occurs, resulting in less noise and rendering detection of a change in magnetic state easier. Moreover, the output signals from the registers of an array may be unipolar signals which can be readily distinguished with less equipment than required for bipolar signals. For example, relatively small and relatively large negative signals, representing binary zero and binary one respectively, may be readily distinguished by rather simple circuits which discriminate between the two amplitudes.

It is an object of the present invention to provide a novel memory device.

Another object is to provide an improved magnetic memory which employs coincident currents for writing information therein.

Another object is to provide anti-coincident current writing means for writing information by coincident currents in a selected one of several memory arrays.

Another object is to provide an anti-coincident current device for selection of one of a plurality of magnetic storage registers.

Another object is to provide an improved storage device wherein a plurality of storage arrays are coupled with a coincident current generator which selectively stores data in one of a plurality of registers in a selected array wherein the coincident current generator is composed of magnetic elements which are selected by anti-coincident currents.

Other objects of the invention will be pointed out in the following description and claims and illustrated in the accompanying drawings, which disclose, by way of example, the principle of the invention and the best mode, which has been contemplated of applying that principle.

With reference to the drawings, the invention is illustrated as a magnetic memory system capable of storing information at a selected address in a chosen one of a plurality of memory arrays. Inputs comprising array selection signals, address signals and data signals are supplied to the magnetic memory system whenever writing takes place. The address signals and data signals supplied as write currents to the magnetic cores of a magnetic switch 1A in FIG. 1 through horizontal lines are coincident with the application of array selection signals on vertical lines which inhibit all magnetic elements except those associated with one vertical line during a writing operation. To a selected one of the horizontal address lines of the matrix 1A, a write current, sufficient to exceed the coercive force, is applied during a writing operation, and to the remaining address lines zero current is applied. Also, write currents on the horizontal lines of the data section of matrix 1A during a writing operation may be zero, or they may be sufficient to exceed the coercive force, where these currents are arbitrarily designated as representing zero or one respectively in the binary system of numbers. Accordingly, one address signal and various data signals are stored in the corresponding cores of the selected vertical line. As soon as the writing operation is terminated, the zero current on the selected vertical line is changed to a reset or read current sufficient to exceed the coercive force, and read out from the cores of the selected column is effected.

Figure 1:
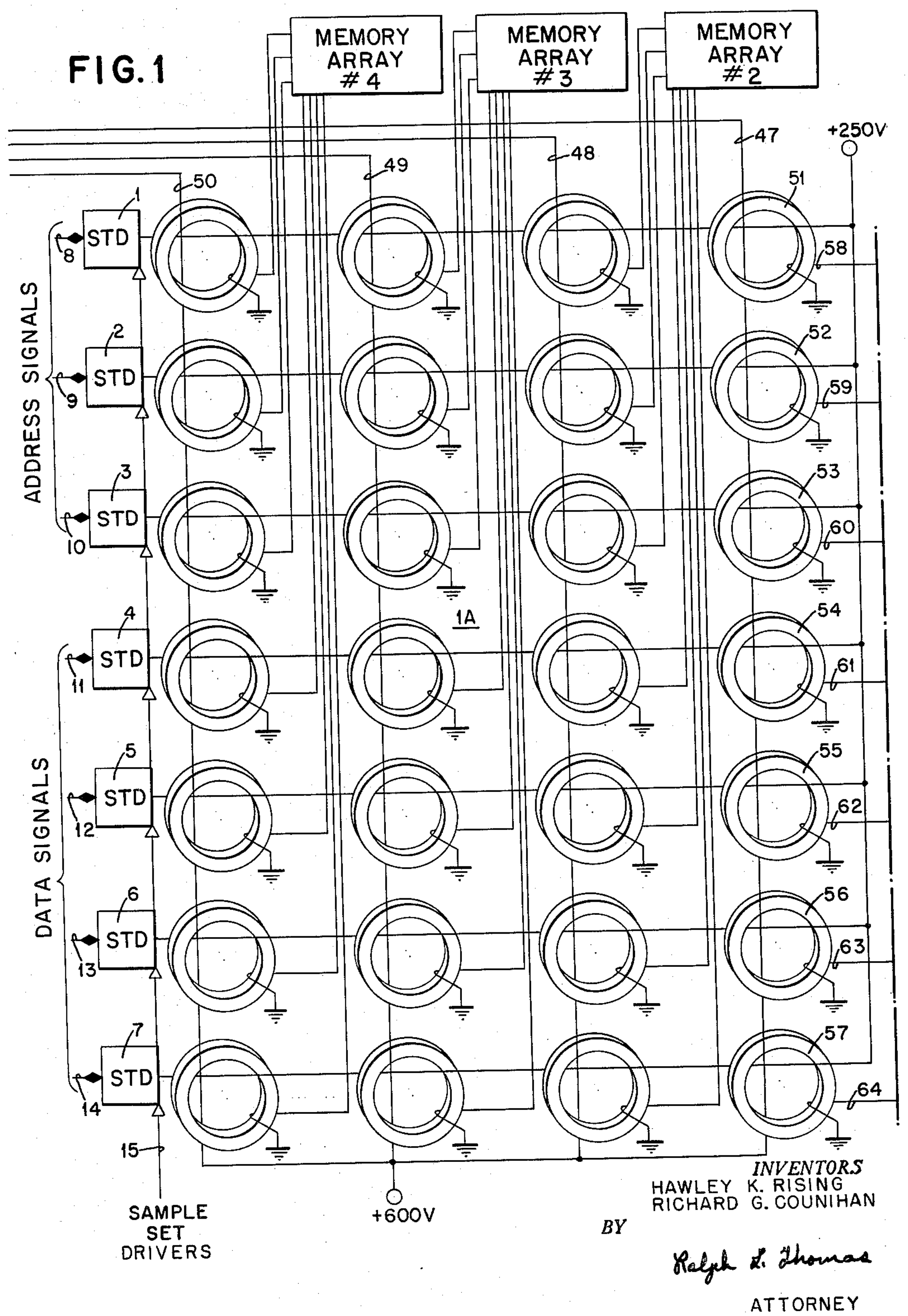
FIGURE 1 shows a magnetic matrix switch coupled with several memory arrays.

If an address core and the various data cores of a selected column of the matrix switch 1A in FIG. 1 are set to a predetermined state by write currents, a read current subsequently applied to these cores causes a reversal of magnetic state which, in turn, establishes half write currents in the associated output conductors of these cores. Since the half write currents established by the address core and the data cores of the matrix switch 1A are coincident in time, they serve to write information in the associated memory array which is of the coincident-current type. Once information is written into the various memory arrays, it may be stored there until needed, at which time it may be read therefrom by interrogating the various storage registers with a negative read current, which creates a magnetomotive force greater than the coercive force, and sensing each storage position for the presence of a signal representative of one in binary notation.

The number of columns of cores in the matrix switch 1A of FIG. 1 is made equal to the number of memory arrays employed; while the number of cores in each column of the matrix switch 1A is made equal to the number of registers in the associated memory array plus the number of storage positions in one register of the associated memory array. Thus, there is one column of cores in matrix switch 1A for each memory array, each column of matrix switch 1A having one address core for each register address of the associated memory array and one data core for each information storage position in a register of the associated memory array. In the illustrative embodiment, four vertical columns of cores are individually coupled with associated memory arrays 1 through 4; three address cores in each column are individually coupled to three addressable registers of the associated memory array; and four data cores in each column are individually coupled to the four storage positions of the addressable registers in the associated memory array.

Referring more specifically to FIG. 1, the magnetic matrix switch 1A is composed of a plurality of magnetic cores arranged in columns and rows as shown. These cores are preferably of the type which have a substantially square hysteresis curve and are capable of being set to one of two stable states. For control purposes, set drivers 1 through 7 receive address signals on respective input conductors 8 through 10 and data signals on respective input conductors 11 through 14. The set drivers serve as coincident type gates which must receive two positive input signals in order to provide a negative output signal on the associated horizontal drive line. Otherwise, zero or no output signal is provided. When address signals and data signals are applied to set drivers 1 through 7, a positive sample pulse applied on a conductor 15 to all set drivers causes any set drivers which have a positive conditioning level from the address or data signals to pass a negative pulse to the associated horizontal drive line. The address signals applied to the set drivers 1 through 3 are such that one is positive and the remaining ones are negative during a given cycle of operation. Since a negative input signal prevents an output signal, it follows that only one of the set drivers 1 through 3 provides a negative current on its output horizontal drive line during a given writing operation. Since data signals supplied to set drivers 4 through 7 are arbitrarily selected as plus for binary one and minus for binary zero, it follows that the data cores are set in one of the bistable states to represent a binary one (hereinafter referred to as the one state) and the remaining cores remain in the opposite bistable state to represent a binary zero (hereinafter referred to as the zero state).

In order for the negative write currents supplied by the set drivers 1 through 7 to effect storage in the cores of a selected column, it is necessary that zero current be applied to the drive line of the selected column and that inhibit currents be applied on drive lines of the non-selected columns. These currents are supplied by the circuits of FIG. 2.

Figure 2:
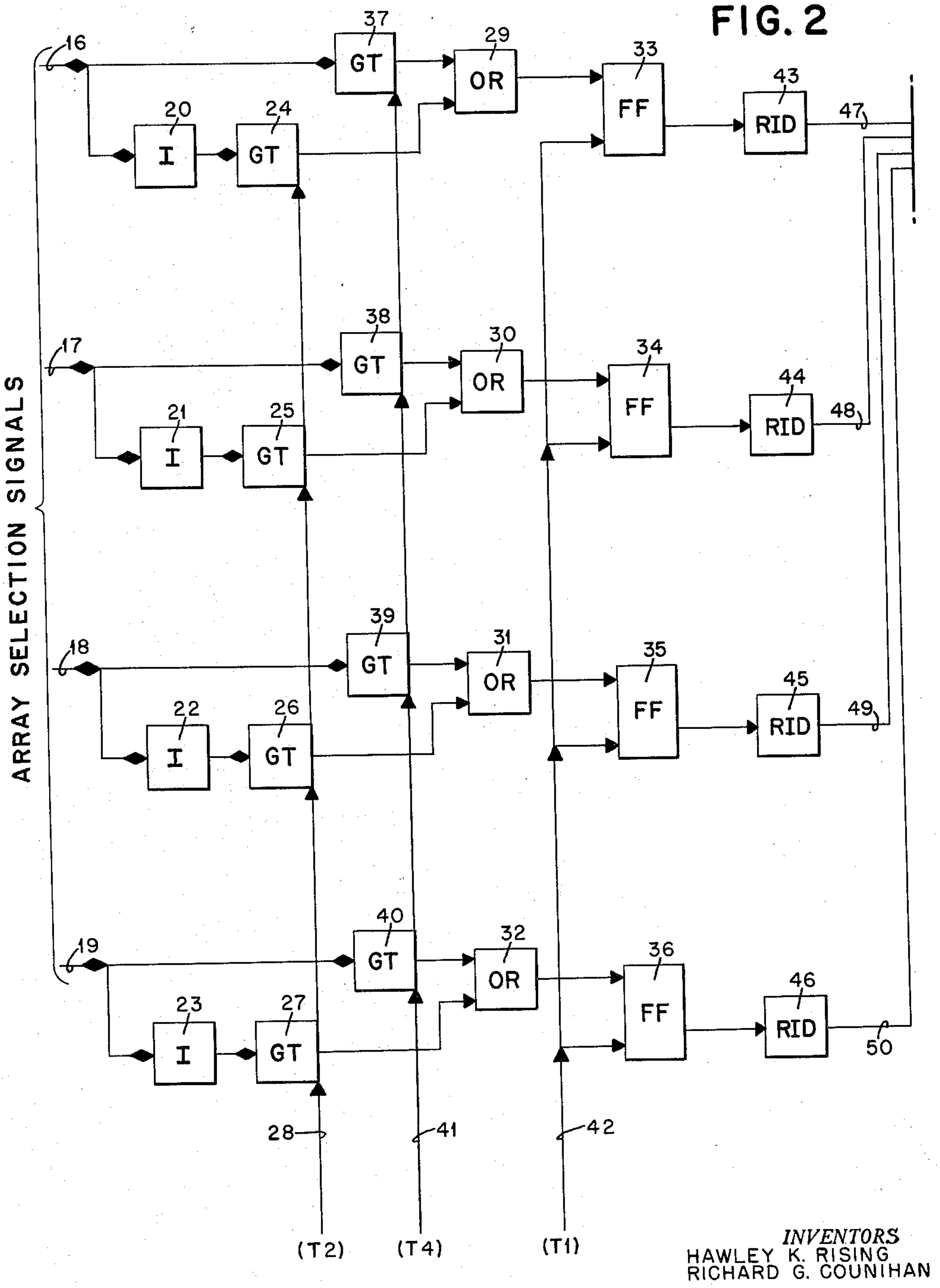
FIGURE 2 shows circuits which cooperate with the magnetic matrix switch of FIG. 1 to control timing and array selection.

Referring now to FIG. 2, array selection signals on conductors 16 through 19 to respective inverters 20 through 23 undergo a change in polarity in the inverters such that the polarity of each input signal is reversed and applied as an output signal level to respective gates 24 through 27. If the signal level to the gates 24 through 27 is positive, these gates respond to a positive pulse on a conductor 28 to pass a positive output pulse through respective OR circuits 29 through 32 to the one input side of corresponding flip-flops 33 through 36. Also, the array selection signals are applied directly as signal levels to gates 37 through 40 which, if the signal level is positive, respond to a positive pulse on conductor 41 to pass a positive output pulse through respective OR circuits 29 through 32 to the one input side of associated flip-flops 33 through 36. Flip-flops 33 through 36 are bistable devices having characteristics such that a pulse applied to the zero input side, arbitrarily represented in FIG. 2 as one of the bistable states, conditions the flip-flop to represent a zero; while a positive pulse applied to the one input side, arbitrarily represented in FIG. 2 as the other of the bistable states, conditions the flip-flop to represent a one. When in the zero state, a flip-flop provides a positive signal level on the zero output conductor; whereas it provides a negative signal level on the zero output conductor if in the one state. A pulse on conductor 42 serves to set the flip-flops 33 through 36 to the zero state of conduction. The zero output side of each of the flip-flops 33 through 36 is connected to the input of respective reset inhibit drivers 43 through 46. The output of each reset inhibit driver is connected to respective vertical drive lines 47 through 50 of the magnetic matrix switch 1A of FIG. 1. The inhibit drivers 43 through 46 are characterized by a negative output signal in response to a negative input signal and a zero output signal in response to a positive input signal.

Figure 3:
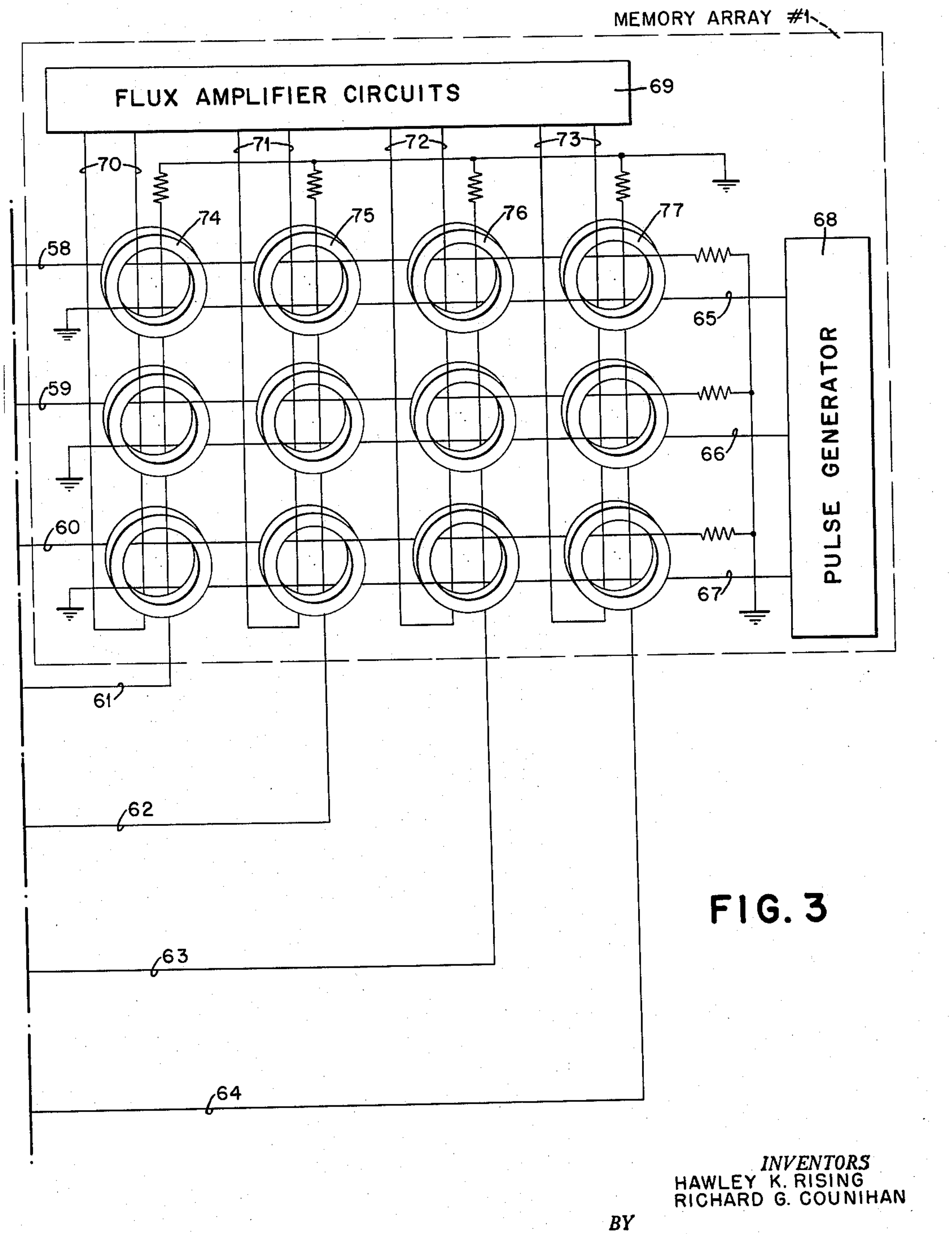
FIGURE 3 shows in detail a coincident current memory array.

The array selection control circuit of FIG. 2 in conjunction with the set drivers 1 through 7 of FIG. 1 serve to control the operation of matrix switch 1A which in turn controls the writing operations in memory arrays 1 through 4 of FIGS. 1 and 3. As the description proceeds further, reference will be made to the family of curves A through E of FIG. 4 in order to point out in greater detail the precise operations which occur in the memory system of the present invention during a cycle of operation.

Figure 4:
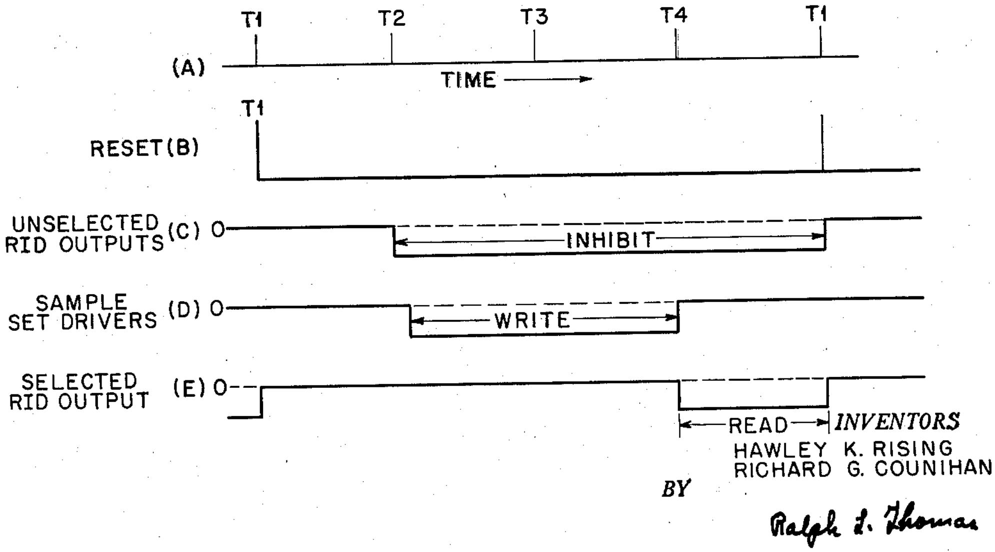
FIGURE 4 is a timing chart relating to the magnetic matrix switch of FIG. 1.

In operation the array selection control circuit of FIG. 2 serves to provide the proper inhibit signals to the vertical drive lines of the matrix switch 1A of FIG. 1. In order to perform this function one of the array selection signals on conductors 16 through 19 is made positive for each cycle and the remaining ones are made negative. Assume for the purpose of illustration that the array selection signal on the input conductor 16 is positive and the array selection signals on conductors 17 through 19 are negative. The first of a series of events in a cycle of operation occurs at time T1 according to the pulse sequence indicated in timing chart "A" of FIG. 4. As indicated by chart "B," the reset operation occurs at each T1 time. Each pulse at time T1 is applied on the conductor 42 in FIG. 2 to the zero input of flip-flops 33 through 36, causing each of them to assume the zero state or reset condition. Since the zero output signals from flip-flops 33 through 36 to the reset inhibit drivers 43 through 46 are positive after a T1 pulse, the vertical drive lines 47 through 50 of matrix 10 in FIG. 1 receive substantially zero current. The characteristic of the reset inhibit drivers, it is recalled, is such that they provide a zero output whenever the input is positive. Next a positive pulse indicated at time T2 on chart "A" in FIG. 4 is applied on the conductor 28 to gates 24 through 27, and since the negative array selection signals applied to the input conductors 17 through 19 are inverted by inverters 21 through 23 and applied as positive conditioning levels to the gates 25 through 27, the positive pulse is passed by the gates 25 through 27. Consequently, the OR circuits 30 through 32 pass the pulses from respective gates 25 through 27 to respective flip-flops 34 through 36, thereby changing these flip-flops from the zero to the one state. Thus, the zero output signals from flip-flops 34 through 36 to the respective reset inhibit drivers 44 through 46 change from positive to negative signal levels, and the reset inhibit drivers 44 through 46 in turn supply negative output currents to vertical drive lines 48 through 50 of matrix switch 1A in FIG. 1. The vertical and horizontal drive lines are threaded on the magnetic cores in a manner such that negative currents to both drive lines create magnetomotive forces in opposition. By the negative currents in the vertical drive lines 48 through 50, writing in the unselected memory arrays 2 through 4 is prevented because the effect of negative write currents on any horizontal line through these cores is sufficiently counter-balanced by the negative inhibit currents on the unselected vertical lines 48 through 50 to prevent a change in state of associated cores. The negative levels from the unselected reset inhibit drivers 44 through 46, commencing at time T2 as indicated by curve C in FIG. 4, continue until the reset operation at time T1. Commencing slightly subsequent to the pulse at time T2, a positive signal level applied on the conductor 15 causes sampling of the set drivers 1 through 7 which, as shown on curve C in FIG. 4, continues until time T4. During this period any set driver which receives a positive address or data signal level on respective conductors 8 through 14 yields a negative output current, and any set driver which receives a negative address or data signal level on these conductors yields zero or no output current. A zero signal level could be used instead of the negative level in the latter instance, but a negative level provides added protection against inadvertently passing a sample pulse. As pointed out above, those set drivers which yield a negative write current on respective horizontal drive lines through associated cores fail to write in cores associated with unselected vertical lines because of the negative inhibit currents in the unselected vertical lines. Since cores associated with the selected vertical line, however, receive zero current on the selected vertical line, writing may take place in these cores if the corresponding horizontal drive line has a negative write current.

Since selection of one of the memory arrays 1 through 4 is accomplished by providing a zero current during a writing operation to the associated vertical drive line of matrix switch 1A in FIG. 1, it is appropriate at this point to examine the novel selection features of the control circuits in FIG. 2. Because the positive input signal to the input line 16 of the array selection circuits in FIG. 2, in the previously assumed illustration, is inverted by the inverter 20 and applied as a negative level to the gate 24, this gate fails to pass the pulse on the conductor 28 at time T2. Consequently, the flip-flop 33, unlike the unselected flip-flops 34 through 36, fails to receive a pulse on the one input side at time T2 and continues in the zero state supplying a positive signal level to the selected reset inhibit driver 43, the output of which is zero as shown by curve E in FIG. 3. This positive signal level from the flip-flop 33 causes the reset inhibit driver 46 to continue supplying a zero current to the selected vertical drive line 47 associated with the column of cores labelled 51 through 57 until read time.

Digressing temporarily, it is noted that each column of cores in FIG. 1 is associated with a given memory array. The cores 51 through 57 of the selected column in FIG. 1 have output windings thereon connected to respective drive lines 58 through 64 which serve a memory array 1, shown in detail in FIG. 3. The magnetic cores of the memory array 1, which may be any suitable type known in the art, are arranged in columns and rows constituting storage registers in the horizontal direction. The coincident application of positive half write currents to one horizontal line and to selected vertical lines effects storage in the cores of the selected horizontal register by the familiar coincident current writing technique.

The various registers in the memory array 1 of FIG. 3 may be interrogated by applying negative write currents, either selectively or successively, to horizontal read out lines 65, 66 or 67 by a pulse generator 68. The pulse generator 68 may be any suitable one of many types well known in the art. In the case where read out is performed successively register by register in a given memory array, the pulse generator 68 is preferably a shift register of the type shown and described in co-pending U.S. application Serial Number 484,677 filed on January 28, 1955, by Wilmur M. McMillan et al. for Magnetic Core Circuit. As the read out lines 65 through 68 are pulsed to effect read out from the horizontal registers of the memory array 1, flux amplifier circuits, shown collectively as block 69 serve to amplify and detect signals created by flux changes representing the presence of binary information during each read operation. Sense windings 70 through 73 associated with the vertical columns serve to provide the flux amplifier circuits with a relatively large signal whenever one of the vertical cores changes state and a negligibly small signal of the same polarity whenever no core in the vertical column changes state. Each of the sense windings 70 through 73 is associated with an individual amplifier circuit described more fully hereinafter.

Returning again to the control circuit of FIG. 2, the positive level on input conductor 16 to the gate 37 and the negative input levels on the three lower input conductors 17 through 19 applied to gates 38 through 40 cause a pulse on the conductor 41 at T4 time to be passed by the gate 37 but not passed by the gates 38 through 40. The pulse from the gate 37 through the OR circuit 29 sets the flip-flop 33 to the one state, thereby changing the zero output level to the reset inhibit driver 43 from a positive level to a negative level. This negative level commencing at time T4 causes the output of the reset and inhibit driver 43 on drive line 47 to change from zero current to a negative current as shown in curve E of FIG. 4. The amplitude of this negative current must be sufficient to exceed the coercive force of the magnetic cores 51 through 57. Information, both address and data, previously stored in the selected column of the matrix switch 1A in FIG. 1 is read out by the negative read current on the vertical drive line 47 commencing at time T4; whereupon any core in the selected column in the zero state provides a negligibly small current on the associated output winding; whereas any core in the one state provides a half write current on the associated output winding. The write period of matrix switch 1A is co-extensive in time with the sample signal applied on line 15 to the set drivers which, as shown in curve D of FIG. 4, commences slightly subsequent to time T2 and continues until time T4. The read period of matrix switch 1A is co-extensive in time with the negative level of the selected reset inhibit driver from time T4 to time T1 as shown in curve E of FIG. 4. The read period of the matrix 1A is coetaneous with the write period of the selected memory array.

Only one of the address cores of the selected column of matrix 1A is set in the one state in a given write period when writing into an associated memory array. In the illustrative embodiment, only one of the cores 51 through 53 is set to the one state in a given write period. Assuming, for example, that in the previous illustration where the column of magnetic cores associated with vertical drive line 47 is selected, set driver 1 receives a positive signal on conductor 8 and set drivers 2 and 3 receive negative signals on respective conductors 9 and 10. Then the address core 51 receives a negative write current on its horizontal drive line from set driver 1 and no inhibit current from the vertical drive line from reset inhibit driver 43 during the write period. Consequently, the core 51 is set in the one state. In a similar manner, the data cores 54 through 57 of the selected column are set to the one state during the write period if data signals applied to the set drivers 4 through 7 are positive. Assuming that set drivers 4 and 6 receive a positive data signal and set drivers 5 and 7 receive a negative data signal during the write period for example, then the cores 54 and 56 are set to the one state during the write period by a sample pulse on conductor 15 between the time T2 and time T4 as shown on the curve D in FIG. 4. The cores 55 and 57 continue undisturbed in the zero state since zero current appears on both the vertical and horizontal drive lines during this period. As the output level of the selected reset and inhibit driver 43 changes from zero to a negative read current at time T4 (shown as the read period on curve E in FIG. 4), the address core 51 and the data cores 54 and 56 are driven from the one state to the zero state. Consequently, positive half write currents are simultaneously induced in the output windings to the horizontal drive line 58 and the vertical drive lines 61 and 63 of memory array 1; while negligibly small currents are induced in horizontal drive lines 59, 60, and in vertical drive lines 62 and 64 of memory array 1. Since the register composed of the upper row of horizontal cores 74 through 77 of memory array 1 receives half write currents on horizontal drive line 58 and vetical drive lines 61 and 63, the magnetic cores 74 and 76 are changed from the zero to the one state. The stable state of magnetic cores 75 and 77 remains unchanged in the zero state since the half write current on horizontal drive line 58 fails to exceed the coercive force. In a similar manner other information supplied to the magnetic cores 51 through 57 of the rightmost column of the matrix switch 10 in FIG. 1 may be written in the registers associated with the address cores 52 and 53 of this column in order to completely fill the horizontal registers of the memory array 1 in FIG. 3.

It can be seen that writing may occur in a selected register of memory arrays 2, 3 or 4 by properly selecting the associated vertical column of cores of matrix switch 1A of FIG. 1 and providing this column with the proper address signals and data signals in the manner previously described with respect to the memory array 1.

Whenever a core in the selected column of matrix switch 1A undergoes a change in state during the write period shown on curve D in FIG. 4, an undesired current flows in the output winding and associated drive line. The direction of this current flow is such that it tends to disturb the cores of the associated memory plane, but the magnitude of the disturbance created by such current is insufficient to change the magnetic state of the cores in the memory plane. However, such current may be eliminated by using a diode in each drive line poled to prevent this current flow.

While the size of matrix switch 1A is illustrated as four columns of seven cores each, it is to be understood that the number of columns as well as the number of cores per column may be varied as required to satisfy the demands of a given system. Likewise the size of the control circuit in FIG. 2 and the memory arrays may be varied accordingly. For a description of a more elaborate system incorporating some of the principles of the present invention reference is made to application Serial No. 597,612 (IBM Docket 5097), filed on July 13, 1956, by R. J. Cypser for Digital Data Transmission System.

There has been shown and described a novel memory system capable of storing given information at a chosen address in a selected one of a plurality of memory arrays. In one of its novel aspects, the present invention is characterized by a matrix switch in which either no current or negative inhibit currents are employed on all the vertical drive lines to provide affirmative control of the matrix switch with only two drive windings per core. Inhibit currents in the non-selected vertical lines of the matrix switch enhance noise reduction in the non-selected memory arrays. The desirable feature of noise reduction may be attributable in part to the magnetic characteristic of the cores to deviate less from the reset condition in response to an inhibit current than they might deviate in response to some value of current in the reverse direction such as a positive half write current. In one known type of magnetic memory device, for example, X and Y drive lines through a magnetic core are energized simultaneously with positive half write currents to change the magnetic state of the core, and a selected core receives a negative half write current on a third winding, sometimes referred to as a Z winding or inhibit winding, which counterbalances the effect of either the X or Y positive half current and prevents a change in magnetic state. However, whichever one of the X or Y positive half currents not counterbalanced by the negative half write current in the Z winding represents a source of noise in a given core. In other words, an incremental change in noise generation may be effected by a factor of one positive half write current in a given core. The worst situation on a given core in applicants' novel matrix switch occurs when a vertical drive line presents a negative inhibit current and the horizontal drive line presents zero current. The noise factor in such case is greatly reduced because, as pointed out previously, the magnetic property of the core is such that it deviates less from the reset condition under an inhibit current which tends to maintain that condition than it deviates under a write current which tends to change that condition. If a given core receives a negative write current on a vertical drive line and a negative write current on the horizontal drive line, the core is substantially noise free because the two currents cancel the effect of each other. Thus, it is seen that noise in applicants' matrix switch plus any effects thereof coupled through output windings to the non-selected memory arrays is favorably diminished.

Another novel aspect of the apparatus of the present invention is characterized by a matrix switch wherein half write currents for coincident current writing purposes are generated from cores in the same column. The coincident current generation is accomplished with a minimum of equipment by using one portion of cores in a selected column for address purposes and another portion for data purposes. A coincident current writing operation is performed with a positive half write current from one core in the address portion and positive half write currents from given cores in the data portion.

A further novel aspect of the present invention is characterized by the writing operation with coincident currents. In one known type of magnetic memory device, three half write currents are required to write a predetermined binary digit. For example, a positive half current on the X and Y drive lines may be employed to write a binary one; while a third half write current, in addition to positive half write currents on the X and Y drive lines, may be supplied to an inhibit or Z winding to write a binary zero. The current in the Z winding serves to cancel the effect of the current in a Y or X winding. Devices of this type require more equipment and further complicate the noise problem. The apparatus of the present invention eliminates the necessity for a Z or inhibit winding by simultaneously providing positive half write currents to the windings of only those cores where a binary one is to be stored. To the extent that less equipment is required in applicants' writing operation, this invention is more economical to construct and repair as well as more reliable in operation.

*Basic circuits*

Reference will be made to FIGS. 5 through 8 in the ensuing description of various basic circuits shown in block form in FIGS. 1, 2 and 4.

Figure 5:
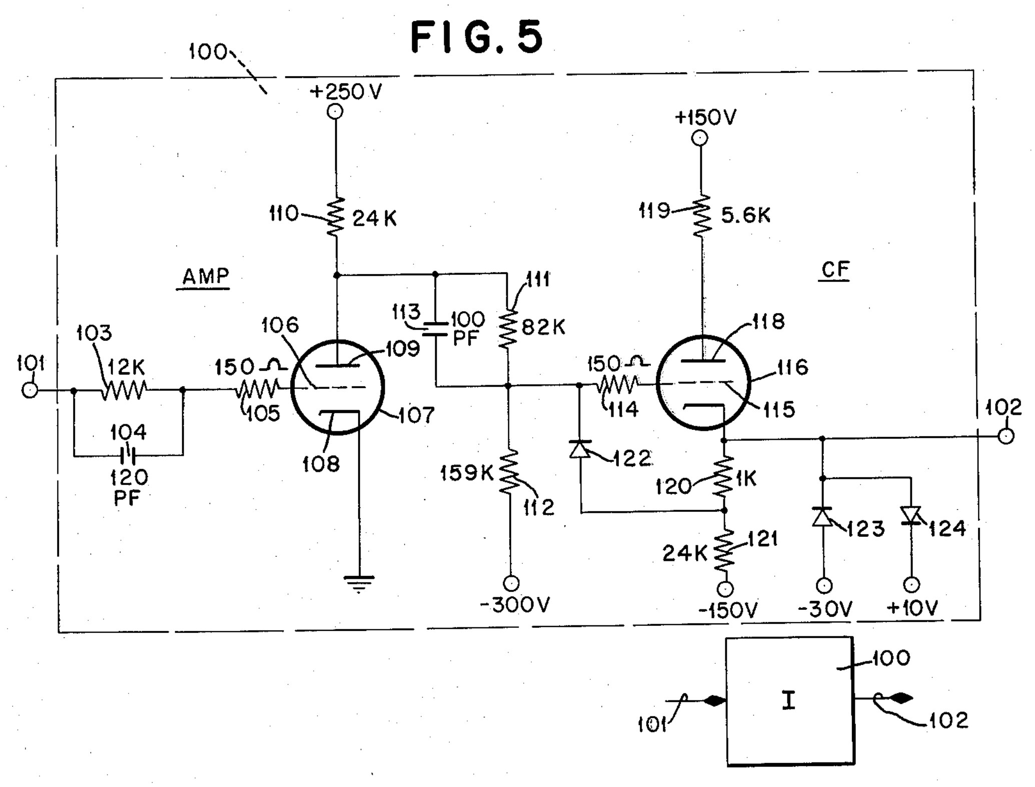
FIGURE 5 is a circuit schematic of an inverter (I) shown in block form in FIG. 2.

Referring first to FIG. 5, the inverters of FIG. 1 are shown as comprising a two stage circuit 100 wherein an input signal on conductor 101 undergoes polarity inversion in the first stage and power amplification in the second stage before being supplied to output conductor 102. A signal level on input conductor 101 is coupled through an RC network, comprising resistor 103 and condenser 104 in series with a resistor 105 to control grid 106 of vacuum tube 107. Current flow through the tube 107, between a grounded cathode 108 and an anode 109, is limited by a resistor 110 and a positive 250 volts source. Since the anode voltage swing varies in a direction opposite to that of the grid, polarity inversion takes place in tube 107. Normally the input voltage to the grid 106 is either plus 10 volts or minus 30 volts. Whenever the input voltage is plus 10 volts, conduction is established in tube 107 and the anode voltage approaches its lower level at some point above ground potential by an amount equal to the voltage drop through tube 107. When the input voltage is minus 30 volts, current flow through the tube 107 is prevented and the anode voltage approaches its upper level at some point below plus 250 volts. This point is determined by a voltage divider comprising resistors 110, 111 and 112 connected serially between a positive 250 volts source and a negative 300 volts source. The output voltage of the first stage at anode 109 is coupled through an RC circuit, comprising the resistor 111 and a condenser 113, in series with a resistor 114 to a grid 115 of a vacuum tube 116 in the second stage. The second stage constitutes a cathode follower wherein the input waveform is preserved with power amplification in the output. Current flow through the tube 116 between a cathode 117 and an anode 118 is limited by the series circuit including an anode resistor 119, cathode resistors 120, 121 and a source of potential, connected as shown. A diode 122 prevents the grid potential from going below the potential at the junction points of cathode resistors 120 and 121. A pair of diodes 123 and 124 serve to limit the signal level on output conductor 102 between minus 30 and plus 10 volts respectively.

Figure 6:
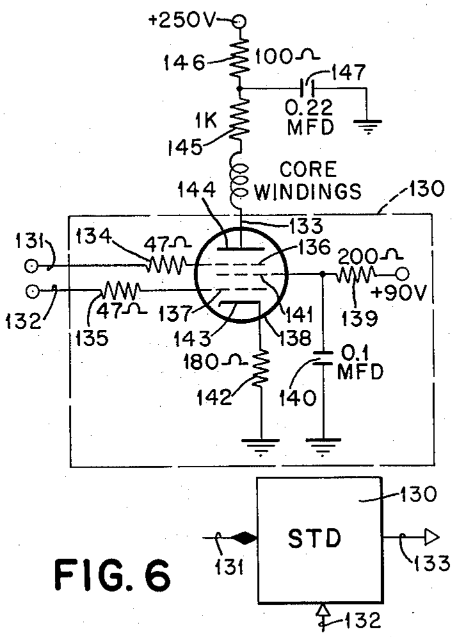
FIGURE 6 is a circuit schematic of a set driver (STD) shown in block form in FIG. 1.

Reference is made to FIG. 6 for a detailed showing of the set drivers shown in block form in FIG. 1. A set driver 130 responds to a positive signal level on input conductor 131 and a positive signal level on input conductor 132 to provide a negative signal level on output conductor 133 during the period both input levels are positive. Input conductors 131 and 132 are connected through respective parasitic suppression resistors 134 and 135 to a suppressor grid 136 and control grid 137 respectively of a vacuum tube 138. A decoupling network comprising a resistor 139 and a condenser 140, connected between a screen grid 141 of vacuum tube 138 and a positive 90 volts source, serves to minimize voltage variation on the screen grid 141 and the 90 volts source from substantially affecting each other. A resistor 142 is connected between a cathode 143 and ground. A signal level from an anode 144 on the output conductor 133 is supplied through magnetic core windings which are represented as horizontal drive lines in FIG. 1. A current regulating resistor 145 and decoupling network comprising a resistor 146 and a condenser 147, not shown in FIG. 2 for the sake of simplicity, are connected in series with the core windings between the anode 144 and a positive 250 volts source. The resistor 145 limits the current through the core windings to a proper value while the decoupling network 146, 147 minimizes any voltage variations on the anode 144 and the positive 250 v. source from substantially affecting each other.

Figure 7:
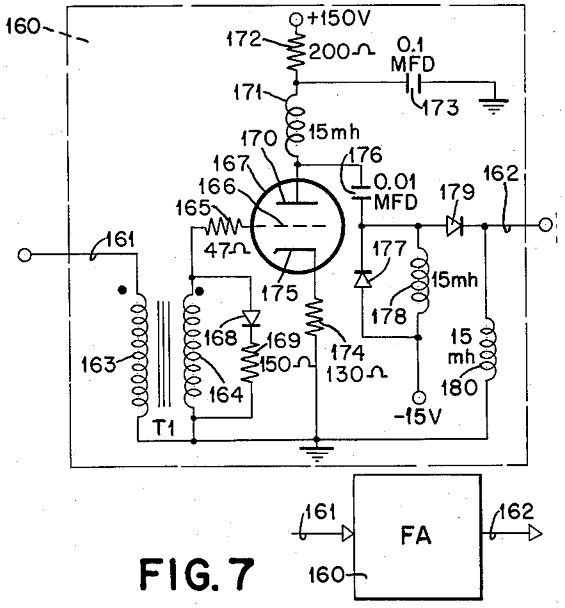
FIGURE 7 is a circuit schematic of a flux amplifier (FA) a plurality of which are employed in a block labelled Flux Amplifier Circuits in FIG. 3.

As pointed out previously in connection with FIG. 3, one flux amplifier for each sense winding is provided in the block 68, labeled Flux Amplifier Circuits, for the purpose of amplifying and detecting signals created by flux changes representing a binary one. One side of each sense winding is preferably grounded to minimize noise and the other side is connected as an input to a suitable flux amplifier. An individual flux amplifier 160 suitable for this purpose is illustrated in FIG. 7 wherein a negative pulse of a given amplitude on input conductor 161 establishes a positive pulse on output conductor 162. Each sense winding is so wound that an induced voltage during read out is always negative. A small negative voltage represents a binary zero while a large negative voltage represents a binary one. A negative pulse on input conductor 161 is applied to primary winding 163 of a 15:1 step-up transformer T1. The polarity of the input pulse is established across secondary winding 164 and coupled through a parasitic suppression resistor 165 to a control grid 166 of a vacuum tube 167. A diode 168 and resistor 169 across the secondary winding 164 serve to limit the amplitude of positive fluctuations in voltage across the secondary winding 164. An anode 170, a choke coil 171 and a resistor 172 are connected serially to a positive source of 150 volts. The resistor 172 and a condenser 173 serve as an isolating network to minimize voltage variations of the anode 170 and the positive 150 volts source from substantially affecting each other. A resistor 174 is connected between a cathode 175 and ground. A condenser 176 is connected in series with a parallel network comprising a diode 177 and a choke coil 178 to a negative 15 volts supply. The diode 177 clamps the potential on the lower plate of the condenser 176 to minus 15 volts in the event this potential should tend to go more negative. A diode 179 and a choke coil 180 are serially connected between the upper side of choke coil 178 and ground.

In the absence of an inuput signal, vacuum tube 167 conducts and the potential at the anode 170 is at a level above ground determined by the voltage drop through the resistor 174 and the vacuum tube 167. If a small negative pulse, representative of a binary zero, is received on input conductor 161, the grid swings negatively and the potential at the anode 170 rises proportionately during the pulse. The amplitude of the positive A.C. component of the resulting pulse coupled through the condenser 176 to the diode 179 is less than 15 volts. The minus 15 volts bias source is not exceeded and the diode 179 fails to conduct. Accordingly no pulse, representing a binary zero, is supplied to the output conductor 162. If a large negative pulse, representative of a binary one, is received on the input conductor 161, the grid swings further negative and the potential at the anode 170 rises proportionately higher. The amplitude of the positive A.C. component of the resulting pulse coupled through the condenser 176 to the diode 179 is greater than 15 volts. The minus 15 volts source is exceeded and the diode 179 conducts, providing a positive pulse on the output conductor 162. The amplitude of the positive output pulse is substantially equal to the amplitude of the pulse coupled through the condenser 176 less the 15 volts of the bias source.

Figure 8:
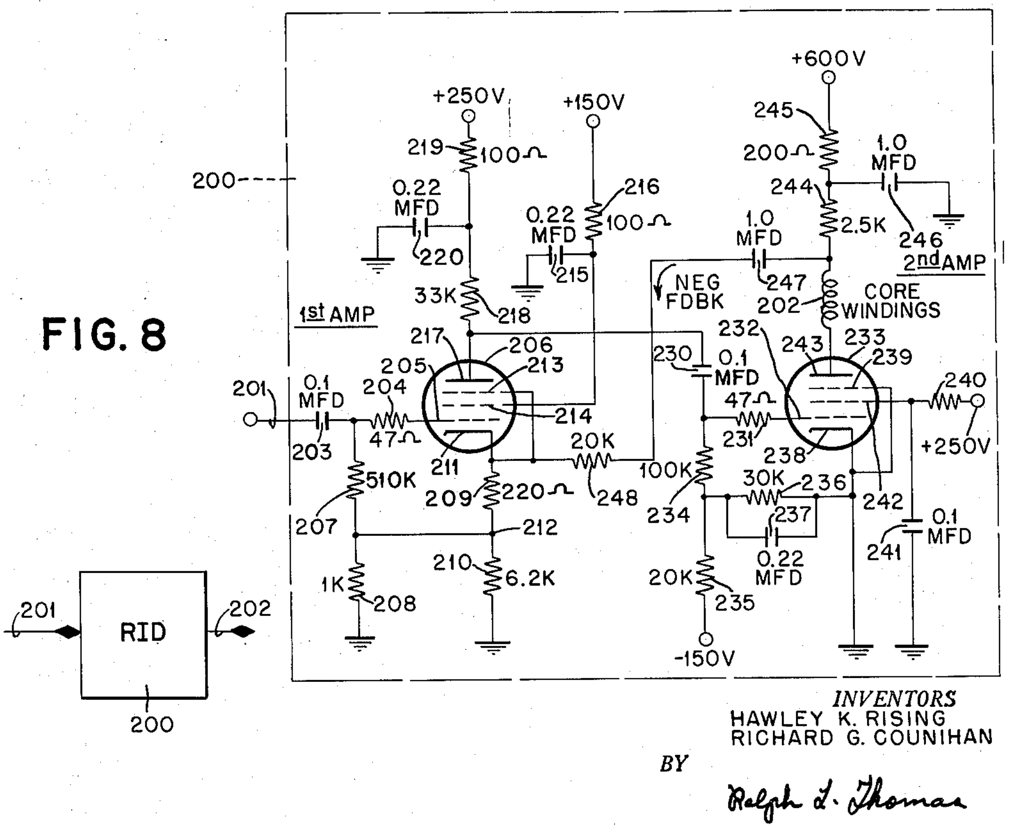
FIGURE 8 is a circuit schematic of a reset inhibit driver (RID) shown in block form in FIG. 2.

Referring now to FIG. 8, the reset inhibit drivers of FIG. 1 are shown as a two stage amplifier 200 which responds to a positive signal level on input conductor 201 to provide a zero signal level on output conductor 202. On the other hand the reset inhibit driver 200 responds to a negative signal level on the input conductor 201 to provide a negative signal level on the output conductor 202.

An input signal on conductor 201 is coupled through a condenser 203 and a parasitic suppression resistor 204 to a control grid 205 of a vacuum tube 206 of the first amplifier. Resistors 207 and 208 are connected serially between ground and the junction of the condenser 203 and the resistor 204 while resistors 209 and 210 are connected serially between ground and a cathode 211 of vacuum tube 206. A junction point 212 is common to the resistors 207, 208, 209 and 210. A suppressor grid 213 of the vacuum tube 206 is connected directly to the cathode 211. A screen grid 214 is coupled to a positive 150 volts source through an RC network including condenser 215 and resistor 216 which serves to prevent voltage fluctuations on the screen and the 150 volts source from substantially affecting each other. An anode 217 is connected through resistor 218 and an RC network including resistor 219 and condenser 220 to a positive 250 volts source. The RC network minimizes voltage variations on the anode 217 and the positive 250 volts source.

The output voltage from the first amplifier is coupled from the anode 217 through condenser 230 and resistor 231 to a control grid 232 of a vacuum tube 233 in the second amplifier. Resistors 234 and 235 are serially connected between a negative source of 150 volts and the lower side of the condenser 230. A bias network comprising resistors 235, 236 and a condenser 237 is connected in the grid-cathode circuit of the tube 233 between ground and the lower side of resistor 234. A cathode 238 and a suppressor grid 239 of the vacuum tube 233 are grounded. An RC network comprising a resistor 240 and a condenser 241 couples a positive 250 volts source to a screen grid 242. This RC network minimizes voltage variations on the positive 250 volts source and the screen grid 242 from substantially affecting each other.

The output current of the second amplifier from an anode 243 on the conductor 202 to core windings, represented as a vertical drive line in the matrix switch 10 of FIG. 2, is limited by resistors 244 and 245. The resistor 245 and a condenser 246 serve to minimize voltage variations on the anode 243 and the positive 600 volts source from substantially affecting each other. In order to insure constant and uniform current flow through the core windings, a negative feedback loop is provided between the anode circuit of the second amplifier and the cathode circuit of the first amplifier. The negative feedback is accomplished by a condenser 247 and a resistor 248 serially connected to the cathode circuit of the first amplifier and the core windings in the anode circuit of the second amplifier. This feedback, sometimes referred to as current feedback, couples part of the output current from the second amplifier to the first amplifier. If the output current through the core windings increases, the feedback current to the first amplifier increases and causes the output voltage level of the first amplifier to decrease. This in turn causes the input voltage to the grid 232 of the second amplifier to be lowered, and consequently the output current from the second amplifier is decreased. If the output current through the core windings decreases, on the other hand, then the feedback current to the first amplifier decreases and causes the output voltage of the first amplifier to increase. This more positive voltage on the grid 232 of the second amplifier causes the output current to the core windings to increase. Once a condition of equilibrium is reached, the negative feedback circuit serves to oppose any change in current flow through the core winding, thereby maintaining a substantially constant amplitude of current flow.

If a zero signal level is applied to input conductor 201 of the reset inhibit driver 200, the potential on the control grid 205 is raised and the potential on the anode 217 drops as conduction is established in the vacuum tube 206 of the first amplifier. The lowered potential at the anode 217 is applied to the control grid 232 of the vacuum tube 233 of the second amplifier and prevents conduction. Thus no output current flows through the core windings. If a negative signal level of minus 30 volts is applied to the input conductor 201 of the reset inhibit driver 200, the potential on the control grid 205 is lowered and the potential on the anode 217 increases as conduction is prevented in the vacuum tube 206 of the first amplifier. The increased potential at the anode 217 is applied to the control grid 232 of the vacuum tube 233 of the second amplifier and initiates conduction. Accordingly current flows through the core windings which, as explained above, is of substantially constant amplitude.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus of the type described including a matrix device having a plurality of magnetic elements having substantially rectangular hysteresis characteristics designated by columns and rows, first and second drive lines associated with each magnetic element, first means to supply current to selected ones of said first drive lines, said current having sufficient amplitude to create a magnetomotive force in a given direction greater than the coercive force of said magnetic elements, said first means providing at least one of said first drive lines with substantially zero current, second means to supply current to selected ones of said second drive lines, said current having sufficient amplitude to create a magnetomotive force greater than the coercive force of said magnetic elements, said magnetomotive force being in a direction opposite to the given direction, each magnetic element having an output winding, a plurality of memory planes, said output winding of each magnetic element in a given column being coupled to a given memory plane, said memory planes being composed of second magnetic elements having substantially rectangular hysteresis characteristics designated by columns and rows, a drive line for each row of second magnetic elements, each drive line being coupled to all second magnetic elements in the associated row, a drive line for each column of second magnetic elements in said memory planes, each drive line being coupled to all second magnetic elements in the associated columns, some output windings of each column of said matrix device being connected to given drive lines of the rows of the associated memory planes, and other output windings of each column of said matrix device being connected to given drive lines of the columns of the associated memory plane.

2. An apparatus of the type described including in combination a matrix device and a plurality of independent memory planes, said matrix device and said plurality of independent memory planes each having a plurality of bistable magnetic elements designated by columns and rows, each column of magnetic elements of said matrix device being associated with a given memory plane, first means to set the bistable magnetic elements of a selected column of said matrix device to alternate stable states to represent binary information, part of said information indicating data and part of said information indicating chosen address for storage, second means associated with said first means for setting all bistable magnetic elements of the selected column of said matrix device to a predetermined stable state, and means responsive to the setting operation of said second means for supplying signals representing said given information to an associated memory plane, said signals representing data being applied as a magnetomotive force to associated columns of said associated memory plane and said signals representing chosen address for storage being applied as a magnetomotive force to an associated row of said associated memory plane, whereby said given information representing data is stored in a chosen address of said associated memory plane.

3. The apparatus of claim 2 wherein the magnetomotive force of said signals applied to the row and columns of said associated memory plane are individually less than the coercive force, but collectively they exceed the coercive force.

4. In combination a matrix device and a plurality of memory arrays, said matrix device and each memory array being composed of a plurality of bistable magnetic elements designated by columns and rows, the magnetic elements in each column of said matrix device being associated with an individual memory array, a first portion of magnetic elements in each column of said matrix device being coupled to supply a magnetomotive force to individual rows of magnetic elements in the associated memory array, a second portion of magnetic elements in each column of said matrix device being coupled to supply a magnetomotive force to individual columns of magnetic elements in the associated memory array, first means associated with said matrix device which responds to array selection signals to select a given memory array by applying a magnetomotive force to all cores of the non-selected columns of said matrix device which inhibits a change in state, second means associated with said matrix device which responds to address signals to set a chosen magnetic element in said first portion of magnetic elements in the selected column of said matrix device to a first predetermined stable state, third means associated with said matrix device which responds to data signals to set given magnetic elements in said second portion of magnetic elements of the selected column of said matrix device to said first predetermined stable state, said first means including further means for setting all magnetic elements in the selected column of said matrix device to a second predetermined state, whereby data from the selected column of said matrix device is stored in a chosen row in the selected memory array.

5. The apparatus of claim 4 wherein the magnetomotive forces applied to magnetic elements in rows and columns of the selected memory array are coincident currents individually less than the coercive force of the magnetic elements, but collectively they exceed the coercive force.

6. An information switching device comprising an array of magnetic elements having two stable states arranged in groups of elements of corresponding order, first and second energizing means associated with the elements of each group, said first energizing means of each group of elements connected in series, said second energizing means of elements of corresponding order in said groups connected in series, means for selecting any of said element groups including a control circuit for applying substantially zero current to said first energizing means of a selected group and for applying to said first energizing means of unselected groups current for producing therein a magnetomotive force in a given direction greater than the coercive force of said elements, writing means associated with said second energizing means for providing to any selected second energizing means current for producing therein a magnetomotive force of like magnitude but in a direction opposite said given direction and to the unselected second energizing means substantially zero current, so that said elements of the selected group are set in states according to information to be switched, and an output circuit associated with each magnetic element for translating a change in magnetic state of the associated element into output current.

7. The device of claim 6 wherein said control circuit is adapted subsequently to apply to said first energizing means of the selected magnetic element group a current for producing therein a magnetomotive force in said given direction greater than the coercive force of said elements.

8. The device of claim 7 wherein said magnetic elements have a substantially rectangular hysteresis characteristic.

9. The device of claim 7 wherein the output circuits of some of the magnetic elements of each group are individually connected to one set of the coordinate drive lines of a corresponding coincident current magnetic memory array of a plurality of such arrays.

10. The device of claim 7 wherein the output circuits of some of the magnetic elements of each group are individually connected to one set of the coordinate drive lines of a corresponding coincident current magnetic memory array of a group of such arrays, and the output circuits of other magnetic units of each group are connected to the other set of coordinate drive lines for said corresponding array.

References Cited in the file of this patent

UNITED STATES PATENTS

| | | |
|---|---|---|
| 2,734,184 | Rajchman | Feb. 7, 1956 |
| 2,734,187 | Rajchman | Feb. 7, 1956 |
| 2,736,880 | Forrester | Feb. 28, 1956 |
| 2,739,300 | Haynes | Mar. 20, 1956 |
| 2,782,399 | Rajchman | Feb. 19, 1957 |
| 2,784,391 | Rajchman et al. | Mar. 5, 1957 |
| 2,785,389 | Warren | Mar. 12, 1957 |
| 2,809,367 | Stuart-Williams | Oct. 8, 1957 |
| 2,852,699 | Ruhman | Sept. 16, 1958 |